Oct. 30, 1956  H. KNUTTI  2,768,555
CEMENTED THREE-LENS APOCHROMATIC OBJECTIVE
Filed April 21, 1955
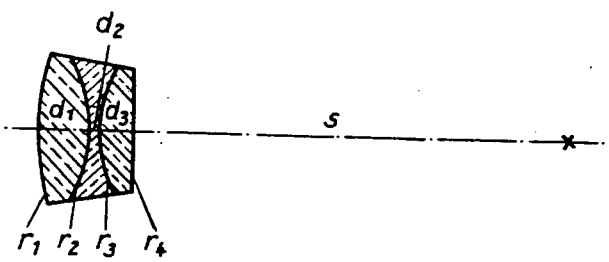

United States Patent Office 2,768,555
Patented Oct. 30, 1956

2,768,555
CEMENTED THREE-LENS APOCHROMATIC OBJECTIVE

Helmut Knutti, Oberkochen, Germany, assignor to Carl Zeiss, Heidenheim (Brenz), Germany Application April 21, 1955, Serial No. 502,894

Claims priority, application Germany April 24, 1954

2 Claims. (Cl. 88—57)

The present invention is relative to an improvement of three-lensed apochromatic objectives, comprising two converging lenses, which enclose and are cemented to a diverging lens. Apochromatic objectives containing three lenses have been known for a long time. Objectives of this type are corrected for the image defects of spherical longitudinal deviation, sine condition, chromatic longitudinal deviation for two colours of the spectral range and also for a third colour, the so-called secondary spectrum. Neglecting the thicknesses, the following equation as a condition for obtaining the chromatic correction results from the theory for the elimination of the chromatic longitudinal aberration for two colours:

$$\frac{\varphi_1}{\nu_1}+\frac{\varphi_2}{\nu_2}+\frac{\varphi_3}{\nu_3}=0 \qquad (1)$$

therein $\varphi_1$; $\varphi_2$; $\varphi_3$ being the power of refraction of the single lenses and $\nu_1$; $\nu_2$; $\nu_3$ the so-called Abbe numbers, i. e. the relative reciprocal chromatic longitudinal aberration for each single lens I, II, III with respect to two colours.

If the indices 1 and 3 designate values belonging to the convergent lenses I and III, 2 those to the divergent lens II, N the resulting Abbe number of the two convergent lenses, i. e. the resulting reciprocal chromatic longitudinal aberration for the two lenses I, III with respect to two colours $$N=\frac{\varphi_1+\varphi_3}{\frac{\varphi_1}{\nu_1}+\frac{\varphi_3}{\nu_3}} \qquad (2)$$

and $$\varphi_{13}=\varphi_1+\varphi_3 \qquad (3)$$

the resulting power of refraction of the same, the following equation may be set:

$$\frac{\varphi_{13}}{N}+\frac{\varphi_2}{\nu_2}=0 \qquad (4)$$

For the correction of the secondary spectrum, i. e. the elimination of the colour longitudinal aberration for a third colour, beside Equations 1 and 4 the following equation must govern:

$$\Theta=\frac{\frac{\varphi_1\vartheta_1}{\nu_1}+\frac{\varphi_3\vartheta_3}{\nu_3}}{\frac{\varphi_1}{\nu_1}+\frac{\varphi_3}{\nu_3}}=\vartheta_2 \qquad (5)$$

In the above, $\vartheta_1$, $\vartheta_2$ and $\vartheta_3$, are the relative partial dispersions of lenses I, II and III. If these relative partial dispersions are related to colour G' as third colour, the following results:

$$\vartheta=\frac{n_{G'}-n_C}{n_F-n_C} \qquad (6)$$

$n_C$; $n_F$; $n_{G'}$ being the refractive figures for the Fraunhofer lenses C, F, G'. $\Theta$ in (5) designates the resulting relative partial dispersion of the two convergent lenses I and III. A precondition for satisfying Equation 5 is the requirement that the relative partial dispersions of all three lenses are not allowed to answer one and the same linear relation of $$\vartheta=A+B\nu \qquad (7)$$

i. e. for one of the three lenses it must be possible to show relative partial dispersion with another constant than applicable to the other two lenses in dependence from $\nu$.

In order to satisfy these requirements the so-called "short flint glasses" in combination with crown glasses have been used up to now. The refractive index of all these glasses used up to now for apochromats are under 1,600 and in accordance with Equation 4 give a resulting $\nu$-value N, which differs only little from $\nu_2$. Since beside Equation 3 the "power of refraction equation"

$$\varphi_{13}+\varphi_2=\Phi \qquad (8)$$

($\Phi$=total power of refraction required of the objective) also must be satisfied, the use of glass types for apochromats hitherto employed means that the absolute amounts of the power of refraction of $\varphi_1$; $\varphi_2$; $\varphi_3$ would have to be very large in comparison to $\Phi$. This resulted in the fact that these apochromatic objectives had a strong Gauss error (chromatic difference of spherical aberration) and a strong zonal aberration of the spherical longitudinal aberration. Serviceable apochromats of this kind have therefore been known only for apertures smaller than 1:10. The invention is based on the discovery made upon systematically examining optical glasses molten in the past years that especially the more recent "heavy flint glasses" with a refractive index of greater than 1.61 and a $\nu$-value smaller than 35 also show $\vartheta$-values whose slope deviates from the normal linear function $A+B\nu$ of the other optical glasses.

The invention consists in that in a three-lens apochromatic objective consisting of two convergent lenses which enclose a divergent lens, for the convergent lens placed as front lens as well as for the divergent lens glasses are used whose Abbe number $\nu$ is smaller than 35 and the relative partial dispersion $$\vartheta=\frac{n_{G'}-n_C}{n_F-n_C}$$

is greater than 1.61, and that the divergent lens has a spherical-chromatic converging cemented surface toward the said convergent lens and a difference in the refractive index with respect to said convergent lens of less than 0.05 for the yellow helium line $d$ and toward the other convergent lens a diverging cemented surface with a difference in refractive index with respect to the other convergent lens of more than 0.1 for the yellow helium line $d$.

By the selection, in accordance with the invention, of the refractive numbers for the lenses such that the collective lens with the higher refractive number is placed in front position, regarding the direction of light incidence, and by the feature that the cemented surface with the dispersive effect is included between the enclosed dispersive lens and the collective lens placed on the side of the image, the back focus of the objective can be shortened. In this manner the objective obtains the action of a tele-objective in that the principal planes are displaced in a direction contrary to the direction of the light incidence. In the reversed sense viz. if the collective lens with the higher refractive number would be located in the rear position regarding the direction of the light incidence, the principal planes would be displaced in the direction toward the focal point of the objective, whereby there results a relatively great back focus and therewith a relatively great overall length of the telescope, in which the objective is employed. This effect would appear then above all, also on that account because the cemented surface with the strongly dispersive action is located in the front part of the objective, whereby this receives the effect of a reversed telescope objective.

The invention makes available the properties of a plurality of the so-called "heavy-flint" glasses which consist therein that those glasses deviate with regard to the above-named linear function $\vartheta=A+B\nu$. A deviation from this linear function is also existent with the above-named "short flint" glasses, however, the latter possess $\vartheta$-values which are lower as compared with the glasses which satisfy the said ordinary linear function. In consequence thereto in the objectives known up to now the "short-flint" glasses could have been used solely in the dispersing lens cemented between two converging lenses of the normal range of dispersion.

The glasses used according to the present invention, however, possess $\vartheta$-values which are higher as compared with the glasses satisfying the said ordinary linear function $A+B\nu$. Now these glasses are used additionally in the one of said two converging lenses and combined with a further convergent lens of normal range of dispersion, while for the diverging lens enclosed by both said converging lenses also a highly refractive glass with low dispersion, i. e. another "heavy-flint" glass is used.

With a standard crown lens as convergent lens III in accordance with Equation 2 an N may be produced for which under adherence to Equation 5 a glass for the diverging lens II can be found whose $\nu_2$ has a larger difference to N which is greater than was attainable with the hitherto known combination of glasses.

With the objectives according to the present invention the greater effective difference in $\nu$-values in conjunction with the higher refractive indices of the heavy flint glasses will result in considerably larger radii of the lens surfaces. In view of this, with the glass combination of the invention a better correction of the zonal aberration and the Gauss aberration may be obtained if by an adequate bending of the individual lenses the spherical longitudinal aberration and the sine condition are corrected. Thereby contrary to the well known objectives, according to the invention, objectives may be created which have a greater aperture ratio, viz. up to about 1:3. For the rest it suffices in most cases if Equation 5 is satisfied only approximately. In addition to that, when applying to objectives with finite thickness a correction to be obtained empirically usually must be made anyway from Equations 1 to 5.

For correction of the image defects it is further advantageous and simultaneously serves for the additional shortening of the back focus, if in accordance with an additional idea of the invention the radius of the front lens facing the object is made smaller than the 0.7 times amount of the objective focal length.

The figure of the illustration shows a form of construction in accordance with the invention. The following table lists the respective values for the radii $r$, refractive indices $n$ and glass thickness $d$, related to a focal length $f=1$, $s$ being the shorter conjugate. It goes without saying that the invention is not limited to this form of construction.

In the illustration and in the following table are designated

With $r$ the radii of the refractive surfaces,
With $d$ the thicknesses of the individual lenses,
With $s$ the back focus from the vertex, facing the image, of the last lens to the focal plane,
With $n_C$ the refractive indices for the C-line,
With $n_d$ the refractive indices for the $d$-line,
With $n_F$ the refractive indices for the F-line,
With $n_{G'}$ the refractive indices for the $G'$-line of the spectrum,
With $\nu_d$ the Abbe numbers,
With $\vartheta$ the relative partial dispersion for the refractive indices of the Frauenhofer lines C, F and $G'$.

*Example*

|  | Lens I | Lens II | Lens III |
| --- | --- | --- | --- |
| $n_C$ | 1.7536 | 1.7473 | 1.5497 |
| $n_d$ | 1.7618 | 1.7552 | 1.5523 |
| $n_F$ | 1.7823 | 1.7747 | 1.5584 |
| $n_{G'}$ | 1.8007 | 1.7920 | 1.5632 |
| $\nu_d$ | 26.5 | 27.5 | 63.5 |
| $\vartheta$ | 1.640 | 1.631 | 1.559 |

$r_1=+0.48697 \quad d_1=0.098 \quad d_2=0.023 \quad d_3=0.067$
$r_2=-0.29427 \quad r_3=+0.24760 \quad r_4=-3.16230$
$s=+0.8544$

I claim:
1. Three-lens cemented apochromatic objective consisting of two convergent lenses which enclose a divergent lens, the one said convergent lens placed as front lens as well as the said divergent lens being made of glasses whose Abbe number $\nu$ is smaller than 35 and the relative partial dispersion

$$\vartheta=\frac{n_{G'}-n_C}{n_F-n_C}$$

is greater than 1.61, the said divergent lens having a spherical-chromatic convergent cemented surface toward the said convergent lens and a difference in the refractive index with respect to said convergent lens of less than 0.05 for the yellow helium line $d$ and toward the other said convergent lens a divergent cemented surface with a difference in the refractive index with respect to the said other convergent lens of more than 0.1 for the yellow helium line $d$., the radius of the front lens on the side of the object being selected greaetr than $0.3 \cdot f$ but smaller than $0.7 \cdot f$, $f$ signifying the focal length of the objective.

2. Three-lens cemented apochromatic objective according to claim 1, the surface refractive powers ($\Delta n/r$) deviating each by at most $\pm 0.2/f$ from the values to be taken from the following numerical example:

| Radii | Thicknesses | $n_d$ | $\nu_d$ | $\Delta n/r$ |
| --- | --- | --- | --- | --- |
| $r_1=+0.48697 \cdot f$ | $d_1=0.098 \cdot f$ | 1.7618 | 26.5 | $+1.5644/f$ |
| $r_2=-0.29427 \cdot f$ | $d_2=0.023 \cdot f$ | 1.7552 | 27.5 | $+0.0224/f$ |
| $r_3=+0.24760 \cdot f$ | $d_3=0.067 \cdot f$ | 1.5523 | 63.5 | $+0.8195/f$ |
| $r_4=-3.16230 \cdot f$ |  |  |  | $+0.1747/f$ | where $r_1 \ldots r_4$ are the radii of the refractive surfaces beginning with the front side, $d_1 \ldots d_3$ the thicknesses of the individual lens elements, $n_d$ the refractive indices, and $\nu$ the Abbe numbers of the glass materials of the lens elements, and $\Delta n/r$ the refractive powers of the refractive surfaces.

References Cited in the file of this patent
UNITED STATES PATENTS

| 576,896 | Rudolph | Feb. 9, 1897 |
| 1,293,086 | Graf | Feb. 4, 1919 |
| 1,479,197 | Merte | Jan. 1, 1924 |
| 1,713,708 | Merte | May 21, 1929 |
| 2,530,397 | Merte | Nov. 21, 1950 |
| 2,571,307 | Taylor | Oct. 16, 1951 |

FOREIGN PATENTS

| 721,462 | Germany | June 10, 1942 |
| 1,082,289 | France | June 16, 1954 |